Patented Aug. 20, 1929.

1,725,652

UNITED STATES PATENT OFFICE.

WALTER KREIS, OF BINNINGEN, NEAR BASEL, SWITZERLAND, ASSIGNOR TO THE FIRM OF CHEMICAL WORKS FORMERLY SANDOZ, OF BASEL, SWITZERLAND.

PROCESS OF EXTRACTING THE CARDIO-ACTIVE SUBSTANCE OF BULBOUS SCILLÆ.

No Drawing. Application filed March 7, 1928, Serial No. 259,922, and in Germany March 16, 1927.

According to the known processes, either by means of organic or aqueous solvents, the cardio-active substance of *Bulbous scillæ* has always been extracted from the bulb mixed with an undesirable and considerable quantity of inactive substances. These substances were removed by more or less complicated methods of purification, which not only involved a loss but even altered the active substance. The methods of purification consist for example either of an extraction of the glucoside by means of organic solvents or of an absorption of the active principle by means of absorptives and subsequent elution or by other methods of purification.

The surprising observation has now been made, that it is possible to extract the cardio-active glucoside from a pulp of fresh squill or from a juice obtained by strong pressing of the fresh bulb, if organic solvents not miscible with water (for example methyl- or ethyl-acetate, methyl-ethylacetone, chloroform), which contain a comparatively small amount of organic solvents being miscible with water (for example ethylalcohol, methylalcohol, acetone), are employed as extracting solvents and if the vigorously crushed bulb is mixed with a sufficient quantity of an easily water soluble salt (for example sulphate of ammonia, sulphate of magnesia, primary sodium phosphate and so on). If the above mentioned organic solvents, being not miscible with water, are employed without the addition of a salt, it is not possible to extract from a pulp of *Bulbous scillæ* a noteworthy quantity of the active substance. Contrarily to this fact it is possible according to present invention to extract the active glucoside almost quantitatively and with relatively small quantities of solvents, if the above mentioned easily water soluble salts are added to the crushed fresh bulb. It is most probable that by the addition of these salts, the active principle is liberated from its adsorption compound with colloidal by-stuffs and, therefore, rendered extractable. The extracts thus obtained contain the glucoside at such a high degree of purity, that the preparation, as for instance obtained by evaporating the extracts at a low temperature nearly to dryness, and precipitating with ether, filtering and drying the precipitation, shows already an activity of 1000 F. D. (Frog doses according to the standard of Houghton-Straub) per one mg., which is a most unexpected result. Already in this state it is possible to crystallize a certain part of the active substance, which hitherto could only be done with great difficulty after further purification. The remainder is very pure too, but still mixed with natural tannin-like substances. This mixture can easily be transformed into pure glucoside by means of tannin precipitating agents.

The addition of easily water soluble salts to watery glucosidic solutions in order to accelerate the extraction of the active substance by means of organic solvents not miscible with water is already known. For instance the U. S. patent specification No. 1,516,552 describes this measure. It must however be considered that in this former process a previous purification of the active principle with tannin precipitating agents has taken place, whereas in the improved process the salts are added at the moment of extracting the drug or the juices obtained from it. In the latter case, the extraction takes place whilst the glucoside is still in connection with a great quantity of by-stuffs and in the greater part still combined with natural tannin-like substances. In view of this entirely different medium and especially in the presence of a great quantity of plant-mucilage, it was quite unexpected that the addition of salts would act in the same manner as in the former process. The elimination of the original mucilageous consistency of the watery substrate of the natural plant is another advantageous feature of this method, which only allows a rational extraction of the active principle.

Further it has been observed, that the transfer of the active principle from the aqueous medium into the organic solvent not miscible with water can be accelerated if aromatic carboxylic acids, like benzoic or salicylic acid, are added to the latter. These admixtures remain in solution when the active substance, after concentration of extracts, is precipitated with ether, for instance, whereby these acids can be separated from the glucoside.

It is of advantage, but not absolutely necessary, to add the salts and the extracting organic solvent during the grinding of the fresh plant. The extraction can also be carried out in the following manner: The plants are vigorously pressed, the juice thus obtained practically contains the whole of the active substance. Sufficient quantities of salt are added to the juice and the solution is then extracted by means of an organic solvent not miscible with water. If dried squill is used as raw material, a sufficient quantity of water is added, and the salt in solid form or as a concentrated salt solution may afterwards be added to the drug, which mixture is then subjected to the extraction as indicated. A good result of this method relies upon a most careful drying of the bulb in order to prevent the active principle being altered.

The fresh plants may be conserved by grinding them together with a sufficient quantity of an easily water soluble salt and carefully drying this mixture at a low temperature. In this state it may be stored until it has to be worked up in the manner as above stated.

Examples.

1. 2 kg. of fresh *Bulbous scillæ* are finely ground with 2 kg. of primary sodium phosphate under addition of two litres of ethylacetate. The pulpy mass thus obtained is then filtered through a cotton filter, vigorously pressed and the residue exhaustively extracted with further quantities of ethylacetate. The liquids as obtained by filtering and pressing are separated and the remaining watery part again extracted but with a smaller quantity of ethylacetate (½ litre for instance).

The ethylacetate extracts are now mixed together, 60 g. of lead hydroxide are added and the mixture evaporated to dryness at a low temperature, whereby the tannoid form is dissociated and the glucoside set free. The residue is stirred with ether, filtered and washed with further ether until this solvent is no longer colored. The glucoside is extracted from the residue by means of 50% ethylalcohol or methylalcohol, which operation needs about 2 liters of those solvents. The residue obtained by carefuly evaporating the extract in the vacuum, represents the pure glucoside and posseses the properties as described in the United States patent specification No. 1,516,552.

2. 2 kg. of fresh squill are cut into thin slices, then dried in vacuo or in a weakly warmed air drying apparatus and ground under addition of one half of its weight of sulphate of ammonia to a dust-fine powder. The powder thus obtained is mixed with ¼ of a liter of water and ½ of a liter of ethylacetate. This mixture is then exhaustively extracted in a percolator with ethylacetate containing 10% of salicylic acid.

The extract is then evaporated in vacuo to dryness at a low temperature, the remaining residue treated with about ½ liter of ether, filtered and the salicylic acid completely washed off with further ether and dried in vacuo. The product thus obtained is worked up to the pure glucoside as indicated in Example 1.

3. 2 kg. of fresh squill are finely ground under addition of ½ kg. of sulphate of magnesium and the mixture is then dried in a vacuum drying apparatus at a temperature below 35° C. The dried material is afterwards ground to a dust-fine powder, mixed with ¼ liter of water and ½ liter of chloroform. It is then extracted in a percolator with chloroform containing 5% of methanol. The extract is then treated according to Example 1, whereby the pure glucoside is obtained.

4. 2 kg. of fresh squill are finely ground and stirred during 15 hours with 8 liters of water. The mixture is then filtered through a cotton filter and the residue vigorously pressed. The aqueous solution is saturated with sulphate of ammonia and then extracted with 8–10 liters of ethylacetate. The watery part is again extracted with about 1 liter of this solvent. The extracts are mixed, filtered and treated with anhydrous sodium sulphate. On working up according to Example 1 the pure glucoside is obtained.

What I claim is:

1. A process for the extraction of the cardio-active substance of *Bulbous scillæ*, consisting in exhaustively extracting watery squill material with organic solvents not miscible with water in the presence of a sufficient quantity of easily water soluble salts.

2. A process for the extraction of the cardio-active substance of *Bulbous scillæ*, consisting in finely grinding fresh squill in the presence of easily water soluble salts and organic solvents not miscible with water, and renewing the organic solvents until the cardio-active substance is completely taken up by these solvents.

3. A process for the extraction of the cardio-active substance of *Bulbous scillæ*, consisting in mixing dried squill with water and a sufficient quantity of easily water soluble salts and exhaustively extracting this mixture with an organic solvent not miscible with water.

4. A process for the extraction of the cardio-active substance of *Bulbous scillæ*, consisting in finely grinding fresh squill in the presence of a sufficient quantity of easily water soluble salts, carefully drying at a low temperature the mixture thus obtained, mixing later on the dried mass with water and extracting this mixture with an organic solvent not miscible with water.

5. A process for the extraction of the cardio-active substance of *Bulbous scillæ*, consisting in preparing a watery extract of fresh squill, adding thereto a sufficient quantity of easily water soluble salts and extracting the solution thus obtained with organic solvents not miscible with water.

6. A process for the extraction of the cardio-active substance of *Bulbous scillæ*, consisting in producing an extraction from squill material by means of organic solvents not miscible with water in the presence of a sufficient quantity of easily water soluble salts, and with addition of organic solvents miscible with water to the organic solvents not miscible with water, in order to accelerate the extraction of the cardio-active substance.

7. A process for the extraction of the cardio-active substance of *Bulbous scillæ*, consisting in producing an extraction from squill material by means of organic solvents not miscible with water in the presence of a sufficient quantity of easily water soluble salts, and with addition of alcohol to the organic solvents not miscible with water.

8. A process for the extraction of the cardio-active substance of *Bulbous scillæ*, consisting in producing an extraction from squill material by means of alkylacetates as organic solvents in the presence of a sufficient quantity of easily water soluble salts.

9. A process for the extraction of the cardio-active substance of *Bulbous scillæ*, consisting in exhaustively extracting watery squill material with organic solvents not miscible with water in the presence of a sufficient quantity of sulphate of ammonia.

10. A process for the extraction of the cardio-active substance of *Bulbous scillæ*, consisting in producing an extraction from squill material by means of organic solvents not miscible with water in the presence of a sufficient quantity of easily water soluble salts, and with addition of aromatic carboxylic acids to the organic solvents not miscible with water, in order to accelerate the extraction of the cardio-active substance.

11. A process for the extraction of the cardio-active substance of *Bulbous scillæ*, consisting in producing an extraction from squill material by means of organic solvents not miscible with water in the presence of a sufficient quantity of easily water soluble salts, and with addition of salicylic acid to the organic solvents not miscible with water, for the purpose set forth.

In witness whereof I have hereunto signed my name this 23rd day of February, 1928.

WALTER KREIS.